United States Patent

[11] 3,603,416

| | | |
|---|---|---|
| [72] | Inventor | William V. Spurlin<br>Indiana, Pa. |
| [21] | Appl. No. | 38,083 |
| [22] | Filed | May 18, 1970 |
| [45] | Patented | Sept. 7, 1971 |
| [73] | Assignee | FMC Corporation<br>San Jose, Calif. |

[54] WEIGHING APPARATUS FOR BELT CONVEYOR
14 Claims, 7 Drawing Figs.

[52] U.S. Cl. .................................................... 177/1,
 177/16
[51] Int. Cl. ...................................................... G01g 11/14
[50] Field of Search ........................................ 177/1, 16,
 211; 198/39

[56] References Cited
UNITED STATES PATENTS

| 3,387,675 | 6/1968 | MacFarlane ................ | 177/16 |
| 3,390,731 | 7/1968 | Schierbeek .................. | 177/16 |

*Primary Examiner*—Richard B. Wilkinson
*Assistant Examiner*—George H. Miller, Jr.
*Attorneys*—F. W. Anderson and C. E. Tripp ABSTRACT: A weighing apparatus for a conveyor belt includes at least one belt supporting roller mounted on a flexible but nonextensible supporting cable or linkage which has at least one end thereof operatively connected to a load cell to measure the tension or tensile force in the supporting cable or linkage. Belt speed is transmitted to the load cell by a tachometer generator so that the output from the load cell is proportional to the flow rate and can be fed into a totalizer and rate indicator for visual recordation.

PATENTED SEP 7 1971
3,603,416
SHEET 1 OF 2
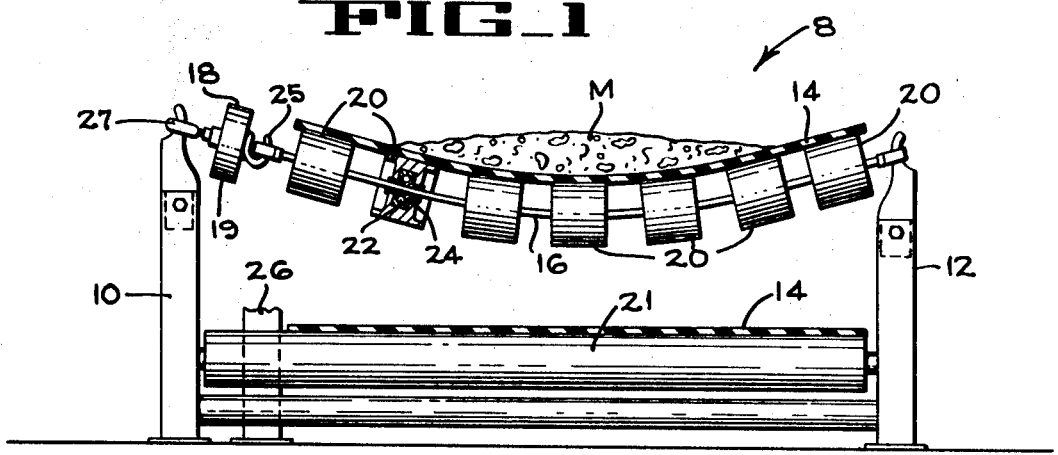
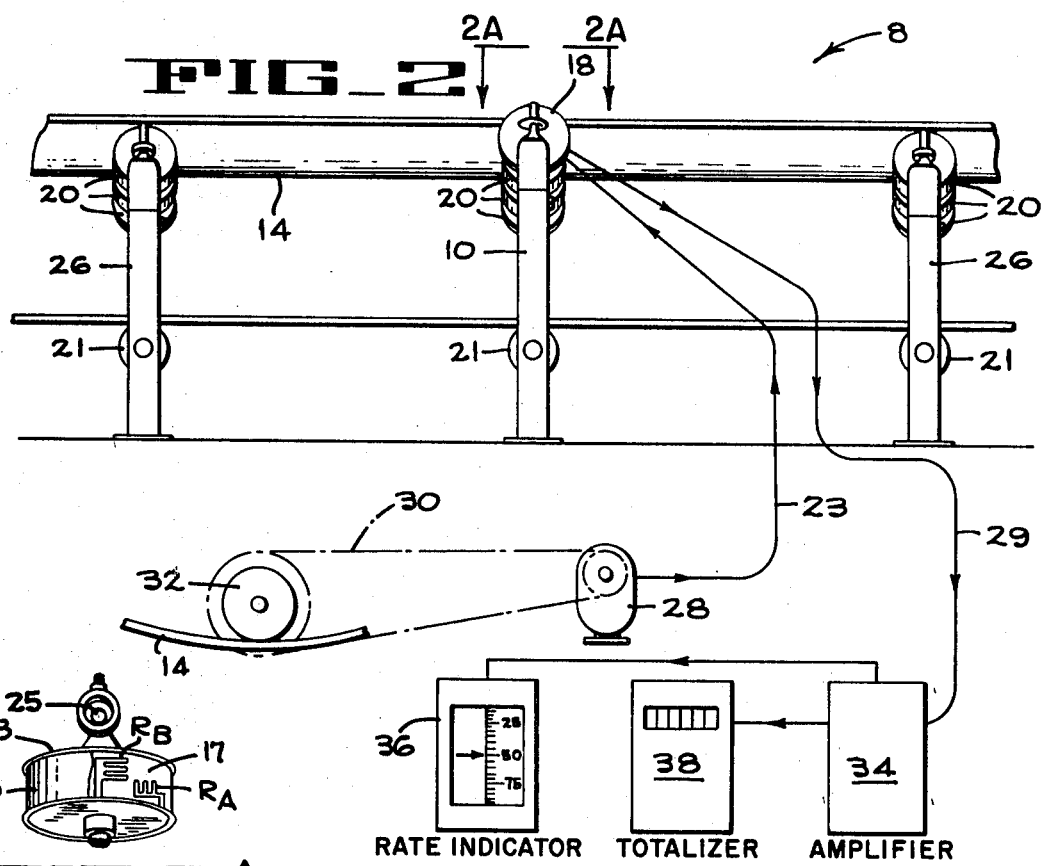
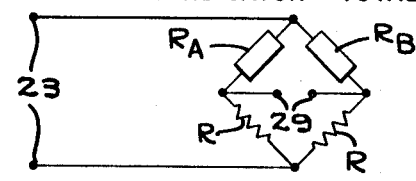
INVENTOR.
WILLIAM V. SPURLIN
BY F. W. Anderson
C. C. Tripp
ATTORNEYS

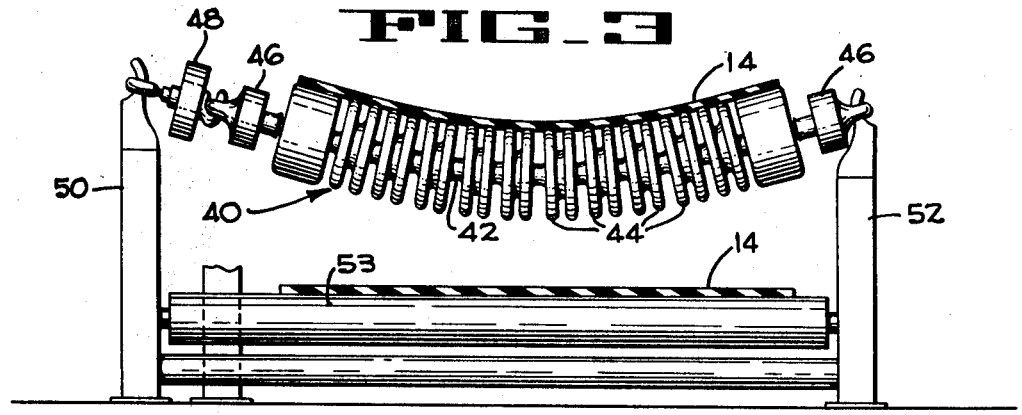
FIG_3
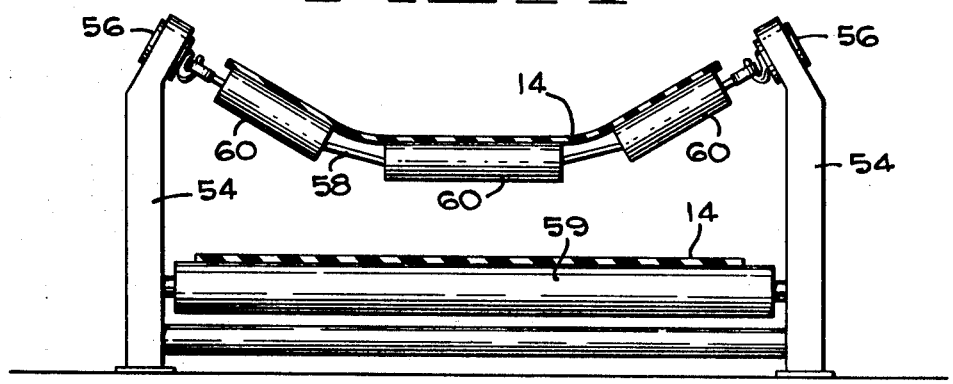
FIG_4
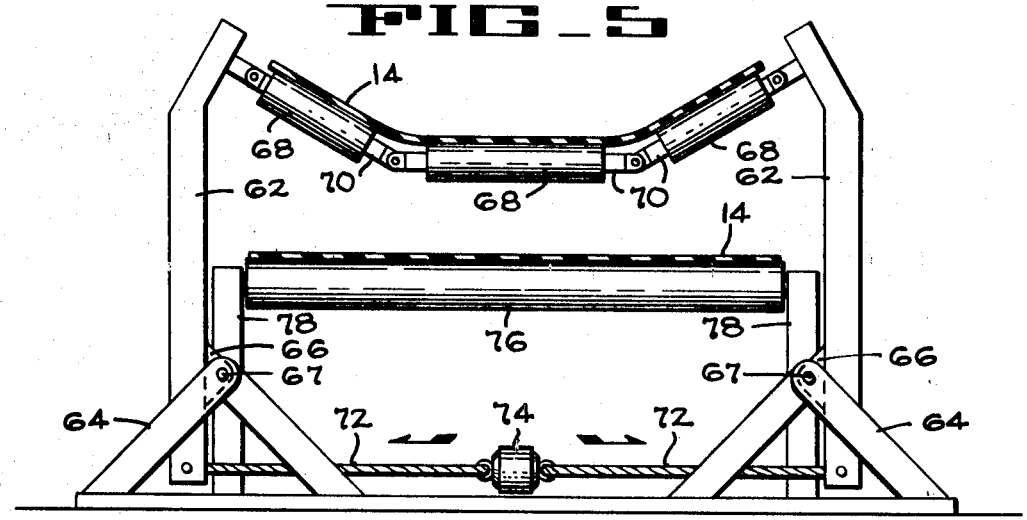
FIG_5

WEIGHING APPARATUS FOR BELT CONVEYOR

BACKGROUND OF THE INVENTION

1. Field of the Invention

The present invention relates generally to weighing apparatuses or scales but more particularly concerns an apparatus for weighing material being transported by a conveyor belt.

2. Description of the Prior Art

Heretofore, numerous means have been employed for the purpose of measuring the load carried by a conveyor belt. Devices for such a purpose have included knife edge fulcrums, flexure plates, resilient material which allows for flexing or bending, and other means. In each device, however, the frame is pivotally or resiliently mounted so as to move vertically in response to the load on the conveyor whereby such movement can be transmitted to a load cell, or the like, included in an integrator circuit. The integrator circuit combines the above measured load with the speed of the belt to accurately produce a measurement of the weight of the material carried by the conveyor belt. All such devices have one or more shortcoming, however, such as bulkiness, wear, maintenance requirements, inaccurate response, undue sensitivity to shock loads, and others.

Typical of the prior art weighing devices known to applicant are those disclosed in U.S. Pat. No. 1,074,123 issued to S. D. Kinne on Sept. 30, 1913, U.S. Pat. No. 3,339,650 issued to L. B. Carr on Sept. 5, 1967, and U.S. Pat. No. 3,163,248 issued to J. C. Farquhar on Dec. 29, 1964.

Each of the devices disclosed in the above patents includes pivotally or resiliently mounted frame members which reflect the load carried on the supported belt by vertical movement of the frame. The movement of the frame is recorded by a calibrated weighing apparatus which integrates the amount of said movement with the speed of the conveyor belt to give a measurement of the weight of the material carried by the belt.

SUMMARY OF THE INVENTION

The apparatus of the present invention is designed to measure a weight moving over a conveyor belt and more particularly to measure the weight of granular solids, liquids, or other such material being transported by a conveyor belt. Weighing apparatuses of this type are commonly termed belt scales or continuous weighing systems in that they are used to weigh material that is in continuous movement across the scales. The weighing apparatus of the present invention differs from those of the prior art in that it utilizes a flexible but nonextensible cable or linkage to support the conveyor belt at a weighing station and directly or indirectly measures the tension in the flexible cable or linkage to determine the load carried thereby. A tachometer generator or similar means electrically transmits to the load sensors a signal proportional to the belt speed so that the belt speed and weight are effectively multiplied to give a signal output proportional to the flow rate in unit weight per unit time. The load sensor output may be fed to an amplifier and subsequently to readout instruments such as a totalizer and rate indicator for visual recordation.

Accordingly, it is an object of the present invention to provide a continuous weighing apparatus which is simple in construction and relatively inexpensive to manufacture.

It is another object to provide a continuous weighing apparatus that will accurately weigh a continuous flow of material carried by a conveyor belt.

Another object is to provide a continuous weighing apparatus wherein a flexible but nonextensible cable is used to support a conveyor belt at a weighing station and at least one end of the cable is connected directly or indirectly to a load cell to determine the tension in the cable and thus the load carried thereby.

It is still another object to provide a continuous weighing apparatus wherein a signal proportional to the conveyor belt speed can be integrated with a signal proportional to the tension in a flexible but nonextensible belt supporting cable to give an output signal proportional to the flow rate of material on the belt.

BRIEF DESCRIPTION OF THE DRAWINGS

FIG. 1 is a front elevation of one embodiment of the weighing apparatus of the present invention with parts broken away for clarity.

FIG. 2 is a side elevation of the apparatus of FIG. 1 and includes a schematic illustration of the integrator circuitry for continuously weighing material carried by the conveyor belt and providing a visual indication thereof.

FIG. 2A is a fragmentary plan with parts broken away taken in the direction of arrows 2A—2A of FIG. 2.

FIG. 2B is a schematic representation of the load cell of FIG. 2A.

FIG. 3 is a front elevation of a second embodiment of the weighing apparatus of the present invention.

FIG. 4 is a front elevation of a third embodiment of the weighing apparatus of the present invention.

FIG. 5 is a front elevation of a fourth embodiment of the weighing apparatus of the present invention.

DESCRIPTION OF THE PREFERRED EMBODIMENTS

As best seen in FIG. 1, one embodiment of the weighing apparatus 8 of the present invention includes uprising supporting standards 10 and 12 disposed on either side of a material carrying conveyor belt 14. A flexible cable 16 (which is preferably a stainless steel wire rope) operatively linked to a load cell 18, interconnects the uppermost ends of the standards 10 and 12, and has a plurality of roller members 20 rotatably fixed along its length to support the underside of belt 14 on the carrying run. An idler roller 21 anchored on either end to the supporting standards supports the return run of the belt 14. The roller members 20 have a ball bearing core 22 to provide a substantially frictionless rotative mounting on cable 16; however, the inner race 24 of bearing core 22 is fixed on the cable to prevent any longitudinal movement of the roller along the cable.

In order to prevent the conveyor belt 14 from migrating to one side or the other and hence becoming offcenter on the weighing apparatus 8, supporting standard 10, to which the load cell 18 is hooked, is slightly taller than supporting standard 12 which supports the opposite end of cable 16. The standards 10 and 12 are also spaced a slightly greater distance apart than other standards 26 along the length of the conveyor belt for the same reason. This slight variation in the size and positioning of standard 10 provides for a smooth even run of the conveyor belt over the weighing apparatus and assures a more accurate weighing of the material M carried by the belt. If the standard 10 were not so altered relative to the other standards the belt 14 would tend to center itself between the standards 10 and 12 and would thus ride on the load cell 18, creating a drag on belt 14 and thus distorting the load measurement of the load cell.

The apparatus thus far described is capable of measuring at any instant the weight of the material on the conveyor belt 14 in an area immediately above the apparatus because the weight of the material in the above mentioned area will place a tensile force or tension in the cable 16 that is proportional to the weight of the material in that area, and the load cell 18 will measure the tension in the cable. Therefore, by calibrating the readout instruments to reflect the actual weight of the material, an instantaneous reading can be made. However, to continuously weigh material that is being carried by the conveyor belt, additional equipment that will be referred to as an integrating circuit is necessary and is schematically illustrated in FIG. 2.

The integrating circuit, which includes the load cell 18, an amplifier, totalizer, and rate indicator, also includes a tachometer generator 28 which measures the conveyor belt speed through V-belt 30 and pulley 32 and serves as a variable voltage supply for load cell 18. The pulley 32, which drives the generator, is in frictional engagement with the conveyor belt 14 so that the voltage into the load cell 18 is proportional to the conveyor belt speed.

The load cell 18, which is a commercially available Conversely, includes a shroud 19 and an inner longitudinally extensible and circumferentially contractable insulating cylindrical drum 17 (FIG. 2A). Affixed to the wall of the drum 17, so as to lie normal to each other, are two strain gages $R_A$ and $R_B$. $R_A$ is affixed so that when the load is placed on the load cell, the gage will be placed in tension and, due to longitudinal extension of the wire of the gage, there will be a decrease in the cross-sectional area of the wire and consequently and increase in its resistive value. Conversely, $R_B$, which lies normal to $R_A$, will be placed in compression by an amount which is proportional to the tension in gage $R_A$ and its resistive value will decrease. Strain gage $R_B$, in addition to being responsive to extension and contraction of the drum 17 so as to magnify the voltage differential provided by the load cell, also functions to compensate for any variations in the resistance of the strain gage wires due to temperature and to compensate for a difference between the thermal coefficient of expansion of the strain gage wire and that of the insulating drum 17.

The operation of the load cell can best be understood by reference to FIG. 2B wherein a schematic view of the cell is shown. It is readily apparent that the circuitry of the cell is identical to that of a Wheatstone bridge. The elements of the circuit include the fixed resistors R and the above mentioned strain gages $R_A$ and $R_B$ which have a variable resistance dependent on the load on the cell. The input voltage to the cell is provided by the tachometer between terminals 23 and the output of the cell is provided between terminals 29. Fundamental electrical principles (see the Strain Gage Primer by Perry and Lissner, pub. by McGraw-Hill, 1955) make it evident that the voltage output from the cell is dependent on the difference in the resistive values of the strain gages $R_A$ and $R_B$ at any particular time. As stated before, due to the perpendicular physical disposition of the gages on the drum 21, as the resistive value of one gage increases the resistive value of the other will decrease. This amplifies the output from the bridge over that which could be obtained if only one strain gage was used and the other was replaced with a fixed resistor. It is apparent that the output from the load cell is, therefore, dependent on the voltage input, which corresponds to the output from the tachometer, and the resistive values of $R_A$ and $R_B$ which vary with the load on the cell. The resultant output from the cell is the product of the voltage input (which is a measure of the belt speed in unit length per unit time) times the load on the cell (measured in unit weight per unit length of belt) and is, therefore, proportional to the flow rate of material M in unit weight per unit time. This output voltage is fed into an amplifier 34 wherefrom it is subsequently fed into a rate indicator 36 where the rate in weight per unit time is visually recorded. The signal emitted from the amplifier is also fed into a totalizer 38 where the total weight of the material passing over the weighing apparatus 8 is computed and visually displayed. The elements of the integrating circuit are conventional items and the details thereof are not critical to an understanding of the present invention. The invention is primarily concerned with a new method and apparatus for determining the weight of material carried by a conveyor belt by measuring the tension in a nonextensible belt supporting cable or linkage.

The weighing apparatus of the present invention is suited for weighing most any type of material carried by conveyor belts, but is best suited for weighing liquid or granular material that will settle into the middle portion of the conveyor belt where the most accurate measurements can be made.

A second embodiment of the weighing apparatus is shown in FIG. 3 and is similar to the embodiment of FIGS. 1 and 2 except that the stainless steel wire rope or cable 16 is replaced with a nylon/neoprene one-piece roll construction 40 which is especially applicable in handling corrosive abrasive, or sticky material. The roll construction 40 consists of a square-woven nylon fabric core 42 with integral resilient neoprene rubber rollers 44. The ends of the roll construction 40 are journaled in ball bearings 46 for free rotative movement. One of the bearings 46 is operatively attached to a load cell 48 which is in turn attached to the uppermost end of a supporting standard 50 which is identical in construction and placement to standard 10 of the embodiment of FIGS. 1 and 2. The bearing 46 at the opposite end of the roll construction 40 is attached to the uppermost end of a standard 52 identical in construction and placement to standard 12 of the embodiment of FIGS. 1 and 2. The weighing apparatus of FIG. 3 is primarily useful but not limited in use to the handling and weighing of fertilizer, chemicals, coke, sand, gravel and other similar materials. It is understood that in practical use, this embodiment, as is the case with all of the embodiments which are included in this disclosure, is linked to an integrating circuit as described above and shown in FIG. 2 for continuously weighing material that is carried by the conveyor belt 14. Roller 53 interconnecting the standards 50 and 52 supports the return run of conveyor belt 14.

The embodiment of the invention illustrated in FIG. 4 has two identical supporting standards 54 which have sockets in their upper ends for fixedly receiving load cells 56. The load cells 56 serve as anchors for the ends of a flexible cable 58 which is preferably a stainless steel wire rope but could be any type of flexible cable that is longitudinally nonextensible. Three elongated rollers 60 are rotatably fixed to the cable 58 to provide a relatively frictionless surface upon which the carrying run of belt 14 rides. Again, this embodiment of the weighing apparatus is linked to an integrating circuit as described above and shown in FIG. 2 for continuously weighing material carried by the conveyor belt 14, the only difference between this embodiment and the previously described embodiments being that the combined weight measured by both load cells 56 is integrated with the conveyor belt speed, rather than the weight measured by the single cell 18 of the embodiment of FIGS. 1 and 2 or the single cell 48 of the embodiment of FIG. 3. An elongated roller 59 interconnects the supporting standards 54 below cable 58 to support the return run of conveyor belt 14.

The embodiment of the invention shown in FIG. 5 has two identical supporting arms 62 pivotally mounted on a frame 64 by brackets 66 and pins 67. Interconnecting the upper ends of the supporting arms 62 is a linkage composed of three roller members 68 rotatably mounted on their respective center shafts 70 which shafts are pivotally tied together in end-to-end relationship and pivotally secured to the upper ends of arms 62. The roller members 68 provide a relatively frictionless surface upon which the carrying run of the conveyor belt 14 rides. The lower ends of arms 62 have nonextensible cables 72 affixed thereto. The ends of the cables 72 not affixed to the arms 62 are connected to a load cell 74 so that when the lower ends of the supporting arms 62 are pivoted outwardly the cables 72 pull in opposite directions on the cell 74. It is apparent that a load on conveyor belt 14 will cause the arms 62 to pivot about pins 67 creating an outward movement of the lower ends of the arms 62 proportional to the weight of the material on the belt 14. The load cell 74 is of course linked to an integrating circuit identical to that used with the embodiments of FIGS. 1, 2, and 3. In this embodiment a roller 76 supporting the return run of conveyor belt 14 is mounted on a separate structure 78 to prevent obstruction of the pivoting supporting arms 62.

Each of the above described embodiments of the weighing apparatus of the present invention provides an apparatus by which the weight of material carried by a conveyor belt can be measured by measuring the tension in a nonextensible supporting cable. This unique apparatus provides a simple and efficient means of continuously weighing material that does not involve cumbersome and complex movable frames as formerly used.

Although the best mode contemplated for carrying out the present invention has been herein shown and described, it will

I claim:

1. A method of weighing material carried by a moving conveyor belt supported by flexible supporting means and having means for measuring the speed of the belt, comprising the steps of measuring the tensile force in said flexible supporting means and continuously multiplying said tensile force times the speed of the conveyor belt to produce a signal proportional to the flow rate of the material carried by the belt.

2. Apparatus for weighing material carried on a moving conveyor belt comprising in combination, flexible supporting means extending across the width of the conveyor belt in supporting relationship thereto, frame means including two arms for suspending at one end thereof the ends of said flexible supporting means, means for pivoting said arms intermediate their length, connecting means joining the ends of said arms opposite said one end, a load cell operatively linked to said connecting means for measuring the tensile force in said connecting means, tachometer means for measuring the speed of the moving belt, means for transmitting a signal indicative of the speed of the belt from the tachometer to the load cell wherein the tensile force in said connecting means and the speed of the belt can be integrated over a period of time to produce a signal proportional to the flow rate of the material carried by the belt.

3. Apparatus for weighing at any instant material carried on a moving conveyor belt comprising in combination, flexible supporting means extending across the width of the conveyor belt in supporting relationship thereto, frame means including two arms for suspending at one end thereof the ends of said flexible supporting means, means for pivoting said arms intermediate their length, connecting means joining the ends of said arms opposite said one end, and a load cell operatively linked to said connecting means for measuring the tensile force in said connecting means.

4. The apparatus of claim 3 further including roller means rotatably mounted on said flexible supporting means and contacting the underside of said belt to provide a substantially frictionless relationship between the belt and the said flexible supporting means.

5. The apparatus of claim 4 wherein said roller means are elongated cylindrical rolls and said flexible supporting means comprises a plurality of center shafts for said rollers which shafts are pivotally connected at their respective ends.

6. Apparatus for weighing material carried on a moving conveyor belt comprising in combination, flexible supporting means extending across the width of the conveyor belt in supporting relationship thereto, frame means for suspending the ends of flexible supporting means, at least one load cell operably connected to said flexible supporting means, tachometer means for measuring the speed of the moving belt, means for transmitting a signal indicative of the speed of the belt from the tachometer to the load cell wherein the tension in the belt supporting means and the speed of the belt can be integrated over a period of time to produce a signal proportional to the flow rate of the material carried by the belt.

7. The apparatus of claim 6 wherein said flexible supporting means is rotatably mounted to said frame means at its ends and comprises an elongated flexible cord having concentric spaced resilient discs integral therewith along its length.

8. The apparatus of claim 6 further including roller means rotatably mounted on said flexible supporting means and contacting the underside of said belt to provide a substantially frictionless relationship between the belt and the said flexible supporting means.

9. The apparatus of claim 8 wherein said roller means comprise a plurality of relatively narrow rolls, and means for affixing said rolls to said flexible supporting means for free rotation but preventing their movement along the length of said flexible supporting means.

10. Apparatus for weighing at any instant material carried on a moving conveyor belt comprising in combination, flexible supporting means extending across the width of the conveyor belt in supporting relationship thereto, frame means for suspending the ends of said flexible supporting means, and at least one load cell operably connected to said flexible supporting means to measure the tension in said flexible supporting means.

11. The apparatus of claim 10 further including roller means rotatably mounted on said flexible supporting means and contacting the underside of said belt to provide a substantially frictionless relationship between the belt and the said flexible supporting means.

12. The apparatus of claim 11 wherein said flexible supporting means is a wire rope.

13. The apparatus of claim 11 wherein said flexible supporting means comprises a plurality of rigid center shafts for the said roller means which shafts are pivotally connected to each other at their respective ends.

14. The apparatus of claim 11 wherein said roller means comprise elongated cylindrical rolls.

PO-1050
(5/69)

UNITED STATES PATENT OFFICE
CERTIFICATE OF CORRECTION

Patent No. 3,603,416      Dated SEPTEMBER 7, 1971

Inventor(s) WILLIAM V. SPURLIN

It is certified that error appears in the above-identified patent and that said Letters Patent are hereby corrected as shown below:

Column 1, line 23:    change "shortcoming" to --shortcomings--.

Column 3, line 5:    delete "Conver-" and insert --item--;

line 6:    delete "sely".

Signed and sealed this 16th day of May 1972.

(SEAL)
Attest:

EDWARD M. FLETCHER, JR.
Attesting Officer

ROBERT GOTTSCHALK
Commissioner of Patents